US007004837B1

(12) United States Patent
Crowder, Jr. et al.

(10) Patent No.: US 7,004,837 B1
(45) Date of Patent: Feb. 28, 2006

(54) CASHLESS GAMING APPARATUS, SYSTEM, AND METHOD OF USE

(75) Inventors: Robert W. Crowder, Jr., Las Vegas, NV (US); Loren T. Nelson, Reno, NV (US)

(73) Assignee: Sierra Design Group, Las Vegas, NV (US)

( * ) Notice: Subject to any disclaimer, the term of this patent is extended or adjusted under 35 U.S.C. 154(b) by 0 days.

(21) Appl. No.: 09/678,169

(22) Filed: Oct. 2, 2000

Related U.S. Application Data

(60) Provisional application No. 60/157,463, filed on Oct. 1, 1999.

(51) Int. Cl.
*A63F 13/00* (2006.01)
*A63F 9/24* (2006.01)
*G06F 17/00* (2006.01)
*G06F 19/00* (2006.01)

(52) U.S. Cl. ............................ 463/25; 463/16; 463/20

(58) Field of Classification Search ................. 463/16, 463/20, 25–29, 40–42; 194/350; 235/379–381; 705/17, 39; 708/23, 26–27
See application file for complete search history.

(56) References Cited

U.S. PATENT DOCUMENTS 4,093,232 A * 6/1978 Nutting et al. .......... 273/121 A
4,518,098 A * 5/1985 Fleischer .................... 212/261
4,669,596 A * 6/1987 Capers et al. ............... 194/210
5,038,022 A * 8/1991 Lucero ........................ 463/25
5,457,306 A * 10/1995 Lucero ........................ 235/380
5,470,079 A * 11/1995 LeStrange et al. ............ 463/25
5,544,728 A * 8/1996 Dabrowski .................. 194/206
5,902,983 A * 5/1999 Crevelt et al. .............. 235/380
5,919,091 A * 7/1999 Bell et al. ..................... 463/25
6,068,101 A * 5/2000 Dickenson et al. ......... 194/206
6,173,955 B1 * 1/2001 Perrie et al. ................ 273/146
6,283,268 B1 * 9/2001 Fletcher et al. ............. 194/344
6,471,590 B1 * 10/2002 Saunders ..................... 463/25
6,475,087 B1 * 11/2002 Cole ........................... 463/20
6,503,147 B1 * 1/2003 Stockdale et al. ............ 463/29

OTHER PUBLICATIONS

MIT, The Switzerland Coke Machine, circa 1993, http://www-swiss.ai.mit.edu/htbin/coke.*
University of Wisonsin—Madison, Coke Manual Page, circa 1997, http://www-2.cs.cmu.edu/afs/cs.cmu.edu/user/bsy/www/wisc.coke.2.html.*
Fey, Slot Machines A Pictorial History of the First 100 Years, 1997, Liberty Belle Books.*

* cited by examiner

*Primary Examiner*—Xuan M. Thai
*Assistant Examiner*—Binh-An D. Nguyen
(74) *Attorney, Agent, or Firm*—Brown Raysman Millstein Felder & Steiner LLP

(57) ABSTRACT

The invention comprises methods and apparatus for modifying or converting a gaming machine to permit fully cash-less or optional cash-less transactions in a manner which avoids changing the existing firmware or software of the gaming machine. In an optional cash-less arrangement, a player selects the form by which finds for added or paid to the machine and/or paid out by machine. The cash-less forms of payment may comprise the acceptance and/or payment of funds or value electronically to a system account, coded card or ticket, smart card, magnetic card and other non-cash elements. In one or more embodiments, the invention consists of hardware and/or software for intercepting and/or emulating any or all combinations of the electronic signals associated with the coin acceptor, cash out button, hopper, serial communication interface(s) and bill acceptor(s) associated with a gaming machine to create optional currency transfers. These currency transfers comprise the dispensing or adding of coins, tokens, bills, or any physical item of value and/or any method of transferring funds electronically.

9 Claims, 16 Drawing Sheets

Prior Art Method for EFT Transfers from System to Gaming Machine

Prior Art Method for EFT Transfers from System to Gaming Machine to System

CASHLESS GAMING APPARATUS, SYSTEM, AND METHOD OF USE

PRIORITY STATEMENT

This application claims priority through, and incorporates herein by reference, the applicant's provisional application filed Oct. 1, 1999, entitled "METHOD AND APPARATUS FOR MODIFYING CASH-ACCEPTING GAMING MACHINE TO PERMIT CASH-LESS TRANSACTIONS," Ser. No. 60/157,463.

FIELD OF THE INVENTION

The present invention relates to gaming and similar machines, and more particularly, to gaming machines configured to accept and dispense cash.

BACKGROUND OF THE INVENTION

Presently, a large number of older machines are in use which are arranged to accept or dispense cash. By cash, it is meant paper and coin currency. For example, many existing casino gaming machines are operable only upon input of cash. In some instances, the cash input must comprise coins. In other arrangements, the input may comprise paper bills and/or coins. These machines are generally arranged to pay out credits, winnings or previously accepted payments in coins.

It is desirable to offer players the ability to pay in a form other than cash—i.e. a "cash-less" arrangement where no cash is used, or a "cash-optional" arrangement where the consumer may elect the form of payment and/or payout. It is also desirable to offer players the option of being paid in a form other than cash. Casinos and other operators of the machines also find it desirable to operate the machines in a cash-less basis, since this substantially lessens the cash handling necessary to operate the business. Further, when the machines are operated in conjunction with smart cards, coded cards, printed tickets or the like, the casinos may offer players a variety of incentive options and obtain and track player play data.

Referring to FIGS. 1 through 4, gaming machines have been developed which are custom configured or designed during manufacture so as to have the capability to permit cash-less transactions. These gaming machines permit both the accepting of funds and payment of funds in a cash-less manner. These machines, however, permit these transactions by having a central processor and associated hardware and software specifically designed to cooperate therewith.

As provided above, many gaming and similar machines are not so configured. Presently, the only manner to convert a casino to an optional cash-less casino is by changing the firmware in every gaming machine. This essentially involves "gutting" the existing machines and installing new hardware and software similar to that of newly designed machines. If this is the chosen route, the manufacturers generally must change all the game machine firmware to support the needed functions for the optional cash-less transactions. In many cases, this would require the manufacturer to resubmit every program that was changed to appropriate regulators, such as gaming regulators, for approval.

Changing the firmware in every gaming machine on a casino floor in such a manner is undesirable by both the manufacturer and casino. For one reason, this approach is very expensive to both the casinos and the manufacturers. In addition, this approach is time consuming, taking the machine out of service for some time.

There is desired a convenient and effective method and/or apparatus for converting machines currently designed to accept and/or pay only cash, to permit cash-less or cash-optional transactions.

SUMMARY OF THE INVENTION

The present invention comprises methods and apparatus for modifying an existing gaming machine which is arranged to accept and/or dispense only cash, to accept and/or dispense funds in a cash-less or other than cash manner.

In one or more embodiments of the invention, a signal generated by an existing cash device of a gaming machine is used to facilitate the operation of a cash-less device. In one or more embodiments of the invention, a signal is generated by a cash-less device, which signal is used to facilitate a cash-less transaction.

Further objects, features, and advantages of the present invention over the prior art will become apparent from the detailed description of the drawings which follows, when considered with the attached figures.

DESCRIPTION OF THE DRAWINGS

Certain prior art and the preferred embodiments of the present invention are shown in the accompanying drawings wherein.

DETAILED DESCRIPTION OF THE PREFERRED EMBODIMENTS

Figure 1:
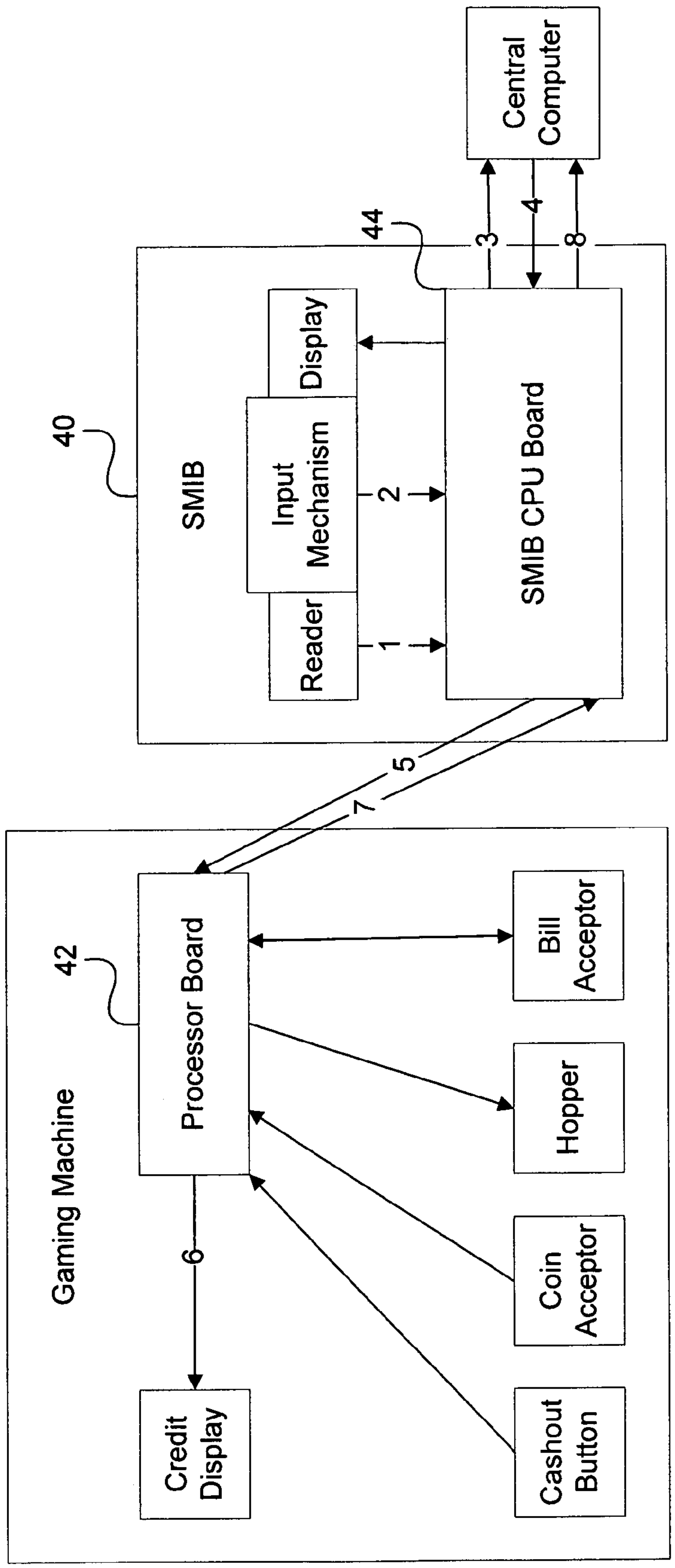
FIG. 1 illustrates a gaming machine in accordance with the prior art specifically configured to accept electronic funds transfers ("EFT") from a central system.
Figure 2:
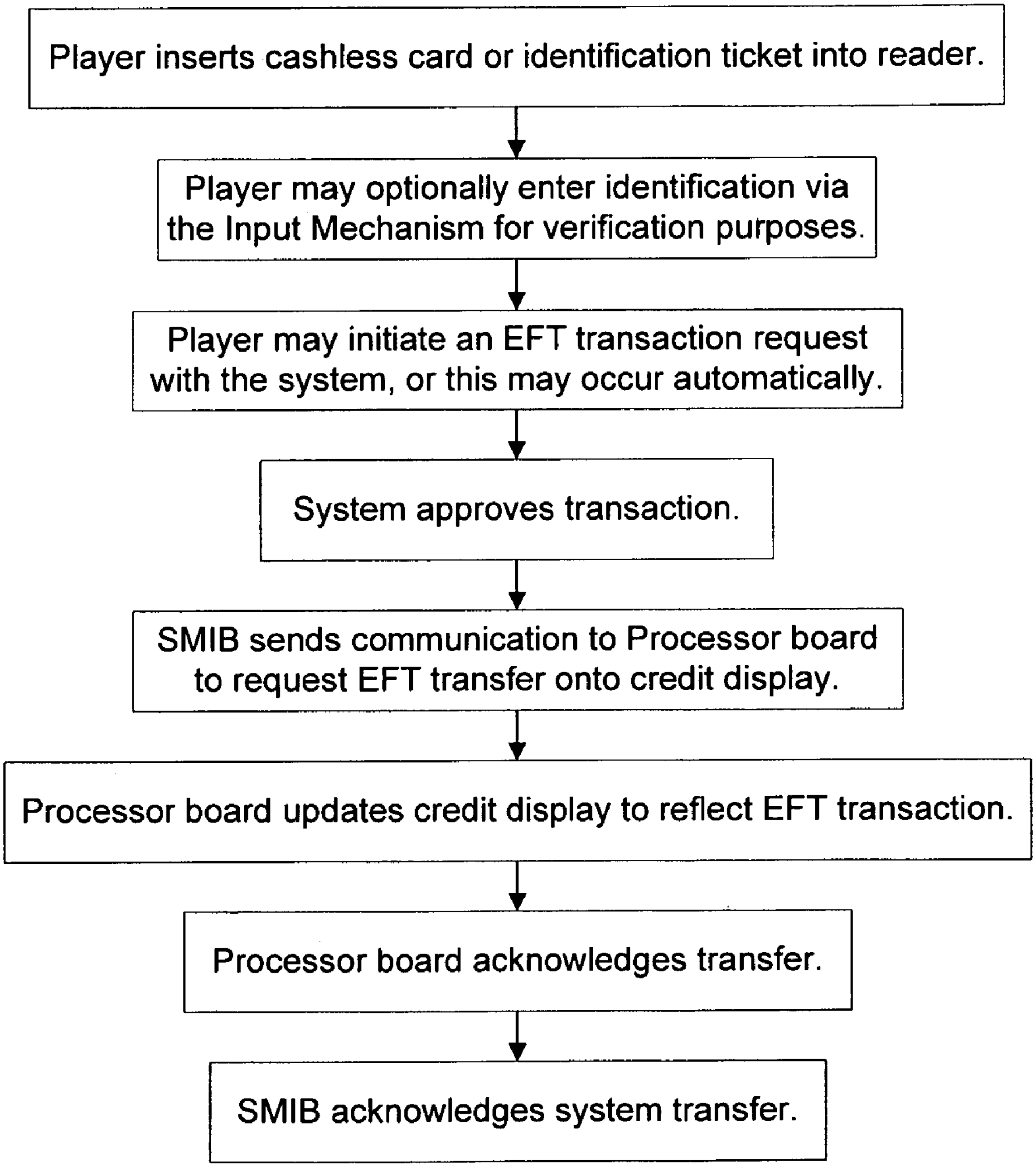
FIG. 2 is substantially a flowchart describing the steps involved in a transfer of funds using the gaming device of FIG. 1.
Figure 3:
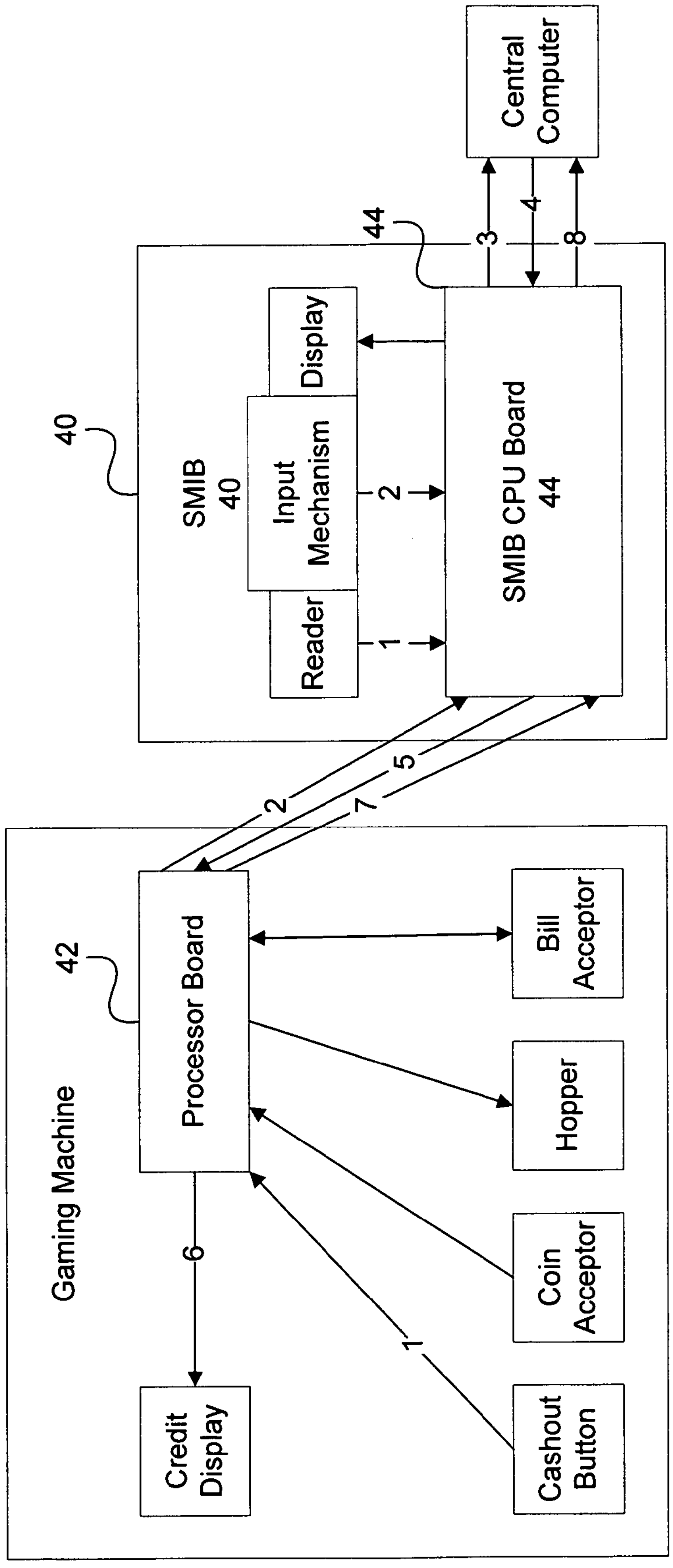
FIG. 3 illustrates a gaming machine in accordance with the prior art specifically configured to permit electronic funds transfers to a central system.
Figure 4:
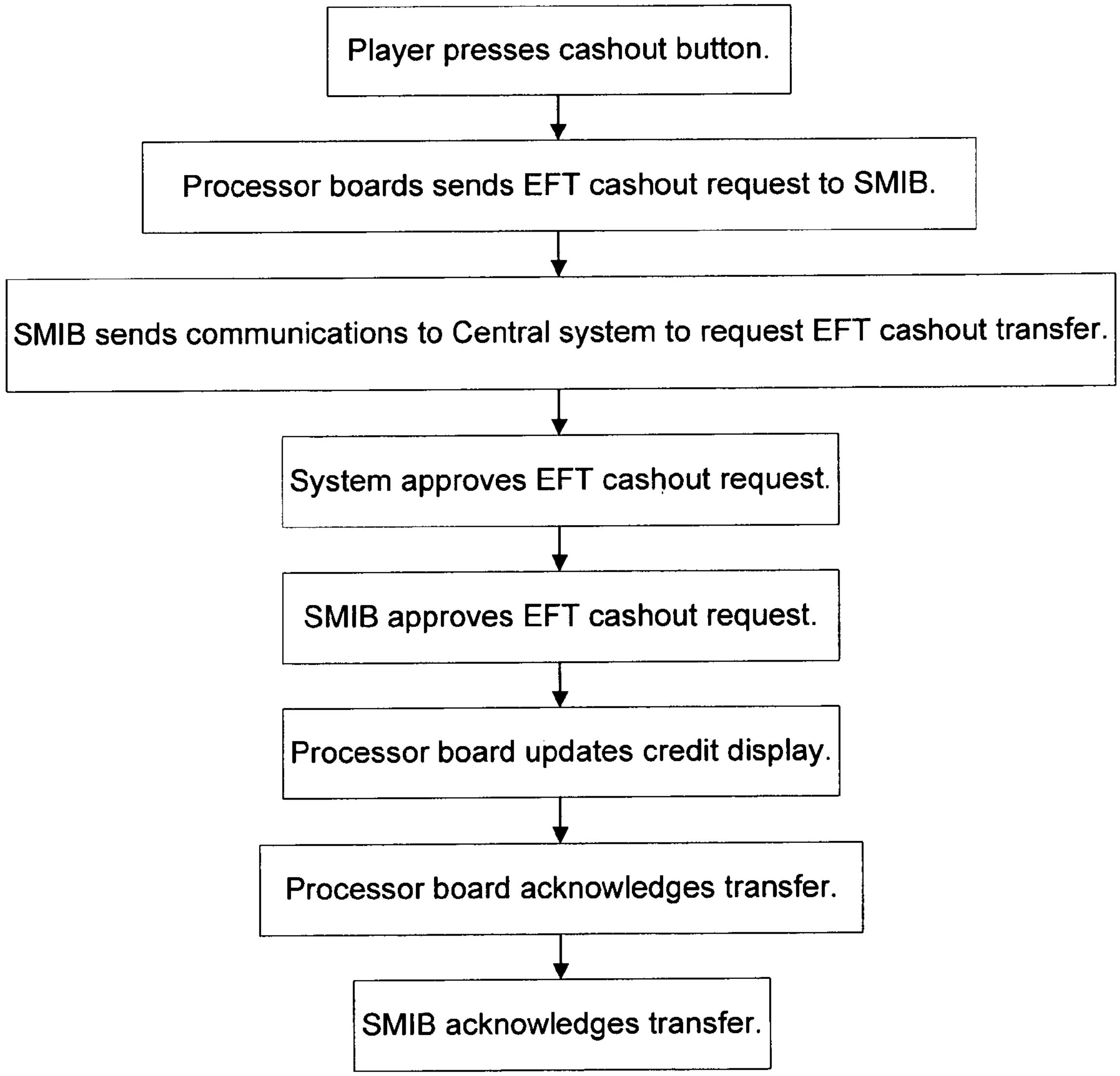
FIG. 4 is substantially a flowchart describing the steps involved in a transfer of funds using the gaming device of FIG. 3.

The invention is a method and apparatus for modifying a cash-only accepting or paying machine, such as a gaming machine, to a cash-less or cash-optional type machine. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention is described with specific reference to and has particular applicability to a gaming machine. Such machines are known as "slot" machines, "video poker" machines and the like depending on the different games which they offer for play. Those of skill in the art will appreciate that the invention may be applied to a wide variety of other apparatus which are arranged to accept and/or pay out cash. For example, the invention may be applied to a product dispensing machine such as a candy machine, pop machine or the like.

In one or more embodiments of the invention, methods and apparatus are disclosed for permitting an existing gaming machine which is configured only to accept payment in cash and/or pay out winnings in cash, to accept payment in a form other than cash and/or pay out winnings in a form other than cash. By "cash" it is meant paper currency and coins. The paper currency may comprise bills such as U.S. or other dollars. The coins may comprise government issued monies, such as quarters, or tokens or similar items. By "cash-optional" or "cash-less" it is meant the acceptance of payment and/or a payout in a form exclusively or optionally in a form other than, or in addition to, cash. A number of forms of payment (by a consumer as input or by the machine as output or payout) other than cash are contemplated, as known to those of skill in the art. These forms may include credit card, "smart cards," other types of coded and uncoded cards and tickets, electronic accounts and the like.

In one or more embodiments of the invention, an electronic signal associated with an element of the gaming machine associated with cash acceptance or payment is intercepted. The intercepted signal may be utilized to prevent the payout in regular fashion by the gaming machine, such as by preventing the dispensing of coins. The intercepted signal is instead utilized to facilitate a "cash-less" payment accepting or paying device associated with the gaming machine. For example, the signal from a coin dispensing mechanism may be used as an input value to a crediting mechanism which codes a magnetic stripe card with payout value data.

In one or more embodiments of the invention, an electronic signal is emulated and output to an element of the gaming machine associated with cash acceptance or payment (such as a coin hopper, cashout button or the like). The emulated signal is utilized to cause the gaming machine to "believe" that payment has been made by a player or a payout has been made using a device associated with the gaming machine. For example, a smart card device is associated with a standard machine. When a player inputs a card, the device is arranged to emulate a coin dropping signal to a coin acceptor of the gaming machine, causing the gaming machine to credit the player.

Figure 5:
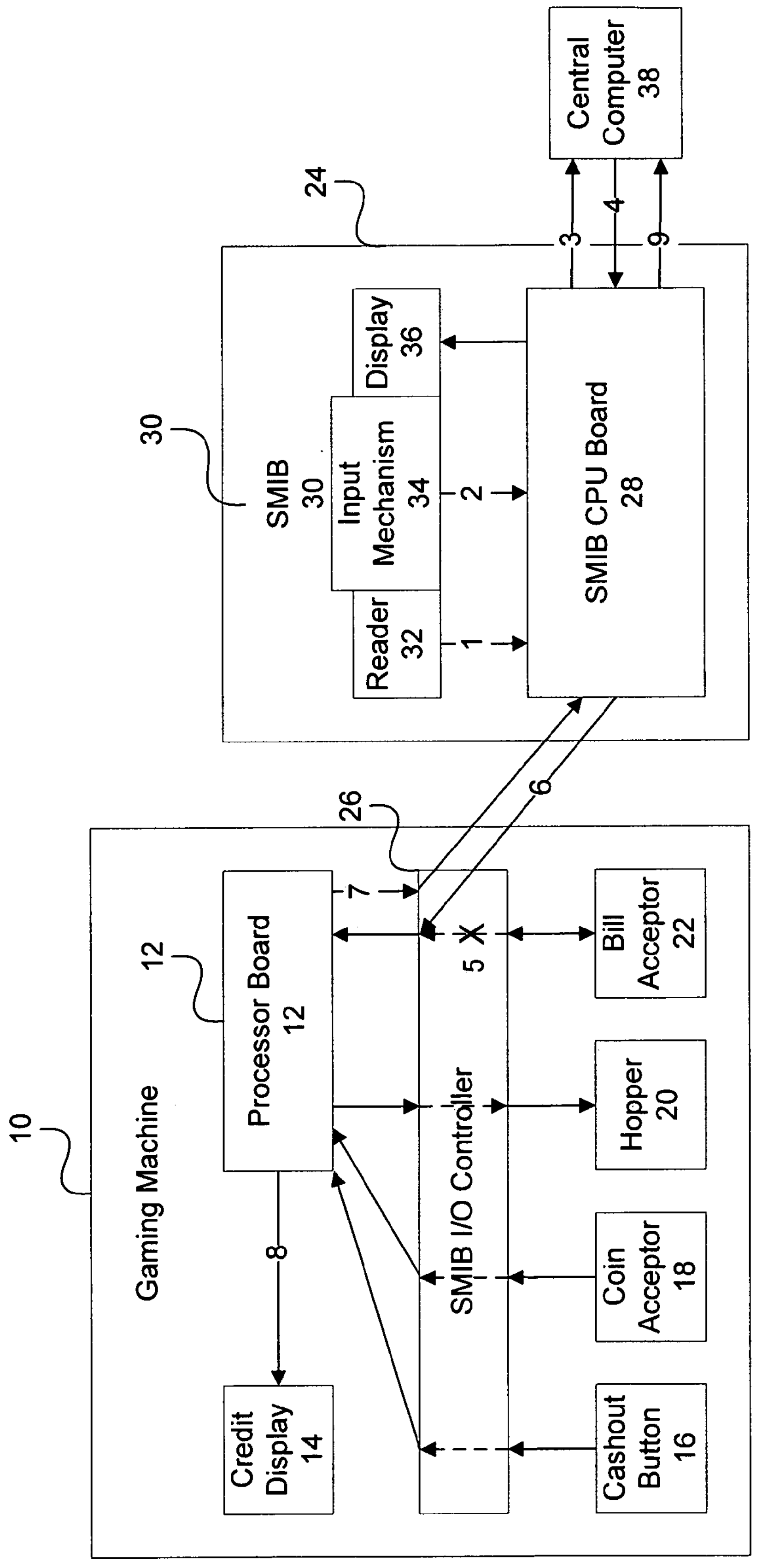
FIG. 5 illustrates an existing cash-type gaming machine modified in accordance with the present invention to permit cash-less funds acceptance.
Figure 7:
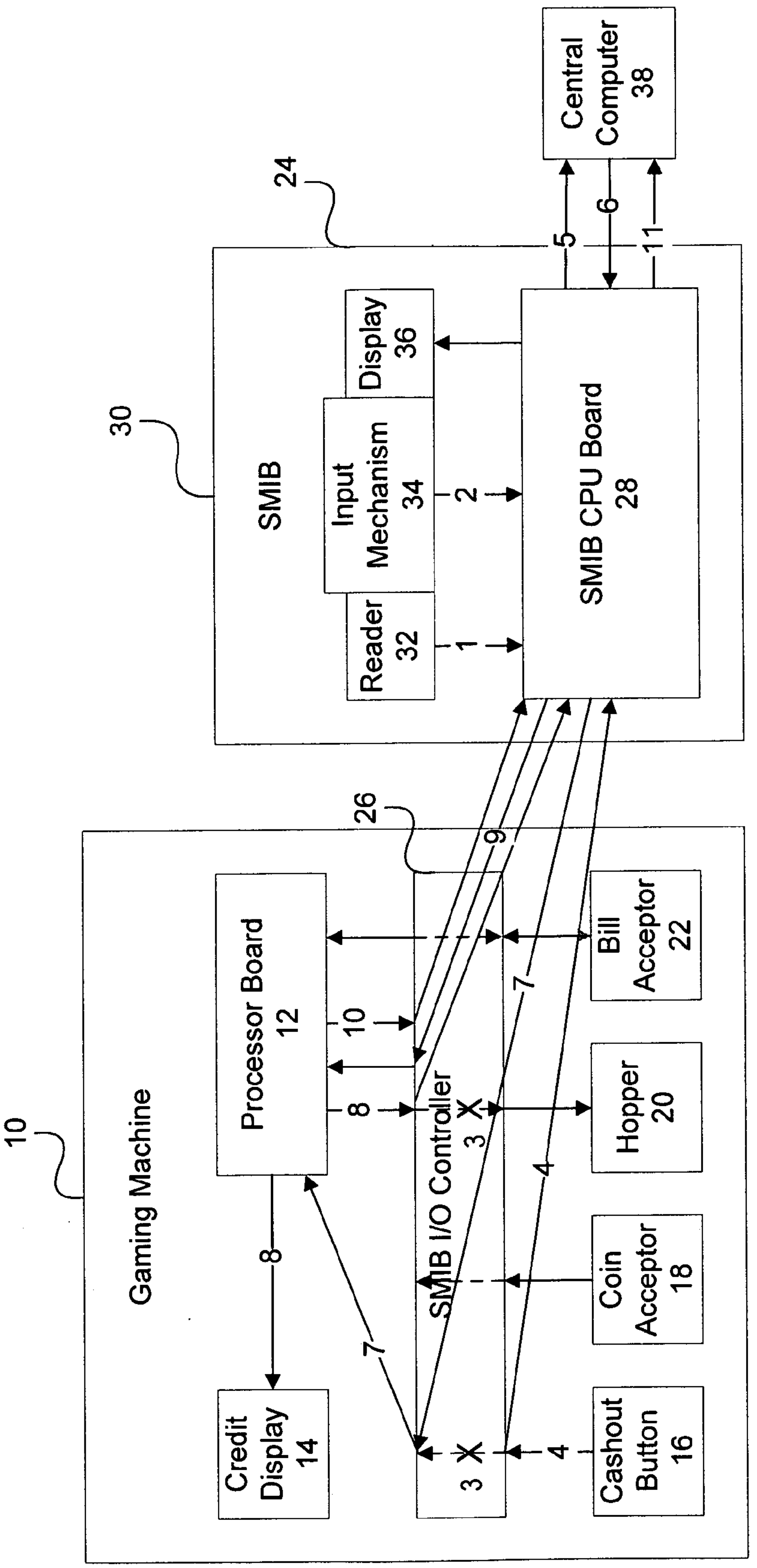
FIG. 7 illustrates an existing cash-type gaming machine modified in accordance with the present invention to permit cash-less funds payment.

FIGS. 5 and 7 illustrate an existing gaming machine, generally 10, having an existing processor 12 for interfacing a credit display 14, a cashout button 16, a coin acceptor 18, a coin dispensing hopper 20, and a bill acceptor 22. These gaming machine elements and gaming machines including such elements are well known, and as such will not be described in detail here. As illustrated in FIGS. 5 and 7, the existing gaming machine 10, has been modified to permit cash-less transactions.

In this embodiment of the invention, the existing gaming machine 10, has been modified with apparatus for permitting the cash-less transactions, generally 24. As illustrated, this apparatus 10 includes a smart machine interface board (SMIB) input/output (I/O) controller 26. The SMIB I/O controller 26 is interfaced with the processor board 12 of the gaming machine 10, one or more of the cash accepting/paying/controlling devices 18, 20, 22 of the machine, and an external SMIB.

The external SMIB 28 is in communication with a cash-less transaction device, generally 30. In the embodiment illustrated, this device comprises a magnetic stripe card reader/writer. The device 30 may comprise a variety of other elements, such as smart card reader, coded or punched card or ticket reader or the like. These cash-less transaction devices 30 are well known and exist in a variety of forms and include a wide variety of input/output devices. These devices 30 may, as described above, be arranged to work with a specific media, such as a card or ticket. In other arrangements, the transaction is purely electronic, such as an electronic funds transfer ("EFT") transfer to a player's bank account. The SMIB 28 is arranged to send to and receive data from the cash-less transaction device 32.

In addition, the SMIB 28 is in communication with a user input device 34. Device 34 may comprise a keypad. The user input device 34 may comprise a wide variety of other elements, such as a touch-screen or the like. The SMIB 28 is arranged to receive data from (and in the case of a touch-screen or similar device, also send data to) the user input device 34.

The SMIB 28 is also in communication with a user display 36. The display 36 is arranged to display information which is provided by the SMIB 28 to a user. The display 36 may comprise a CRT screen, LCD element or the like.

In one or more embodiments, the external SMIB 28 is arranged to communicate with a central computer system 38 or other external source of information or data. The central computer system 38 may provide data to the SMIB 28 such as card verification data, funds data and the like.

It is noted that the term "external" does not refer necessarily to the physical location of the SMIB, but instead to the fact that the SMIB 28, did not originally form a portion of the original gaming machine structure. In general, the SMIB 28 comprises hardware and/or software for performing certain functions. As illustrated, the SMIB 28 includes a processor element. The SMIB 28 may be interfaced with the gaming machine 10 and the cash-less transaction device 30, user input device 34, display 36 and/or central computer 38 by direct wiring, wireless communication elements, or a variety of other means well known in the art.

It is noted that in existing gaming devices generally 40, which permit cash-less transactions, such as illustrated in FIGS. 1 through 4, the gaming machine 40 includes a central processor 42 as well as a SMIB 44 or similar processor. In this arrangement, the SMIB 44 and central processor 42 are integrated. In other words, the central processor 42 is configured with a special protocol which permits communication with the SMIB 44. To the contrary, in the arrangement of the present invention, the processor 12 associated with the gaming device 10 was not configured with such a protocol. As described above, the reconfiguring of the processor 12 and associated firmware is undesirable.

In accordance with the invention, and as described below, signals which are sent to and/or from the processor 12 to one or more of the cash transaction devices/elements 18, 20, 22 of the gaming machine are intercepted and/or emulated by the SMIB 28. The SMIB 28 uses the intercepted or emulated signals to "trick" the processor 12 into believing that a certain condition has been satisfied or occurred with respect to the cash transaction devices/element 18, 20, 22 associated therewith. At the same time, the SMIB 28 utilizes information associated with the signal to facilitate a cash-less transaction.

Figure 6:
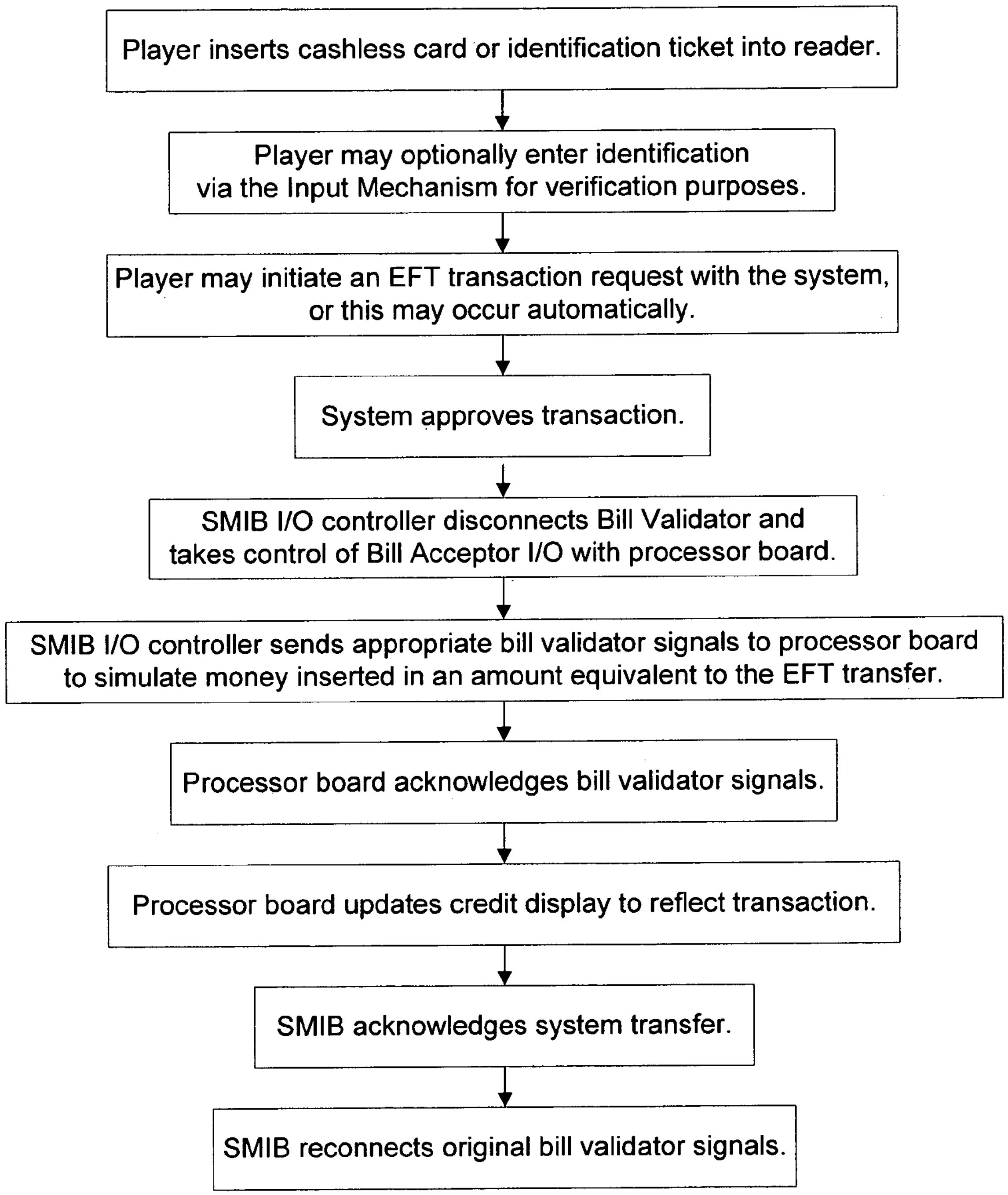
FIG. 6 is substantially a flowchart describing the steps involved in accordance with one embodiment of the invention.
Figure 8:
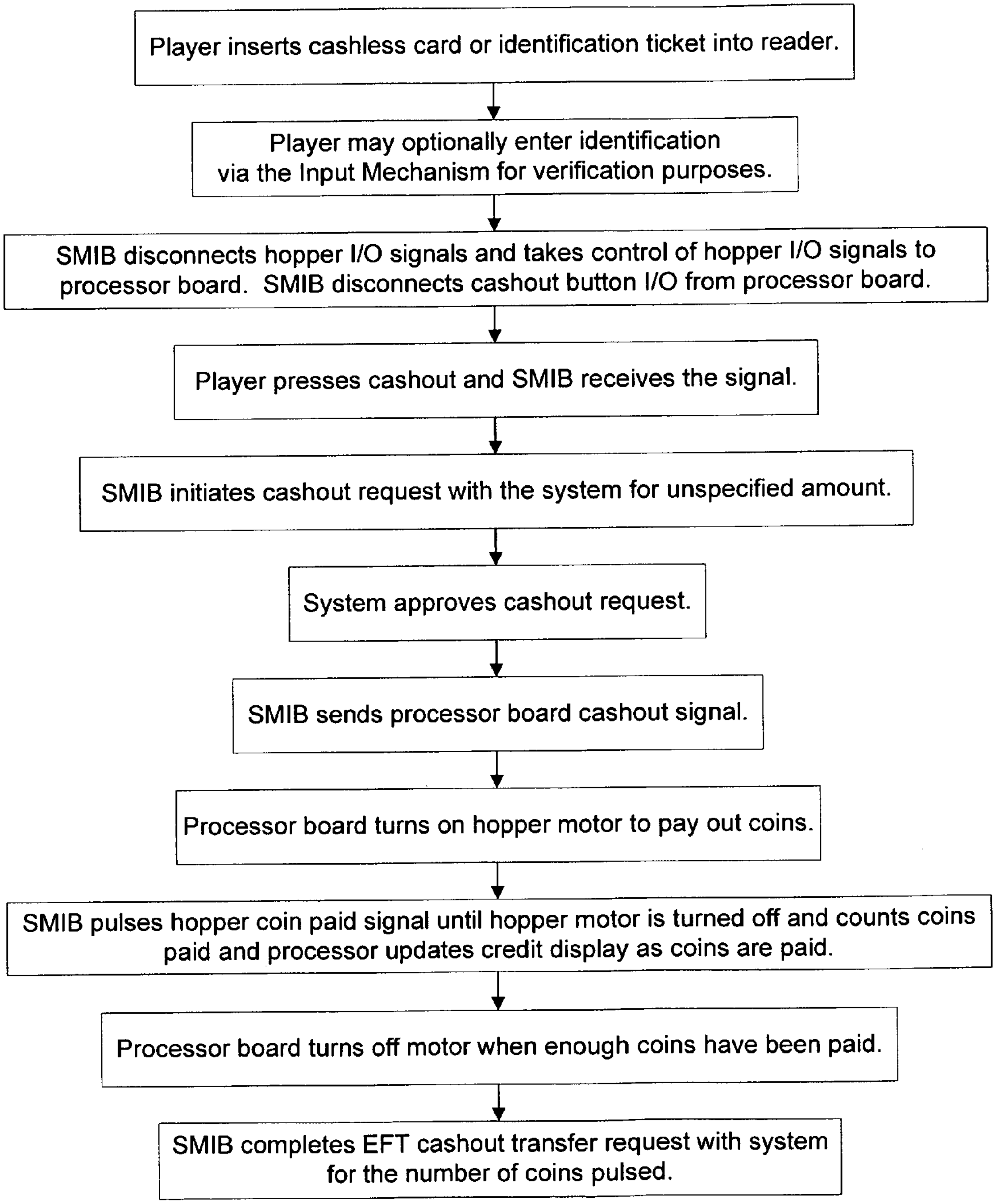
FIG. 8 is substantially a flowchart illustrating a transfer in accordance with one embodiment of the invention.

FIGS. 6 and 8 also provide flowcharts describing embodiments of methods of cash-less transactions in accordance with the invention. As illustrated in FIG. 6, the apparatus of the invention permits a player to provide finds to the gaming machine in a manner which is "cash-less." In accordance with the method, a player may input finds by sliding a coded card through the reader 32 or other cash-less transaction device. The SMIB 28 verifies the existence of funds (such as by the central computer). The SMIB 28 then instructs the SMIB I/O controller 26 to disconnect communications with the bill validator 22 of the gaming machine 10 and then controls the bill acceptor 22 (by appropriate electronic signal). The SMIB I/O 26 controller then generates and sends, as instructed by the SMIB 28, electronic signals to the processor board 12 of the gaming machine 10. These signals emulate and replace signals normally provided by the bill acceptor 22 to the processor 12. In this manner, although the bill acceptor 22 has not received one or more bills, the processor 12 is provided with a signal representative of bill receive, causing the processor to acknowledge the receipt of "payment" signals and the value of the funds transmitted.

FIG. 8 similarly illustrates a method by which a player transfers funds from the gaming machine 10, in a cash-less manner using the apparatus illustrated. In accordance with this method, when a player utilizes a cash-less transaction device associated with the gaming machine, the SMIB 28 disconnects the hopper input/output signal device 20 from communication with the processor 12, as well as the cashout button 16, input/output signals. When a player activates the cashout button 16, the SMIB 28 receives the cashout signal and verifies that the funds transaction is permitted. The SMIB 28 then sends the processor 12 a cashout signal. The processor 12 then signals the hopper control 20 to activate. The SMIB 28 pulses a hopper coin paid signal until the hopper 20 motor is turned off, then counts the number of pulses (representing the number of coins which are to be paid) and updates the credit count. Once the processor 12 has an indication that payment has been made, it shuts off the hopper motor 20, at which time the SMIB 28 completes the cash-less transaction by crediting the player's card, account or the like.

FIGS. 9–16 illustrate and describe specific embodiments of the invention by which cash-less transactions are permitted. In general, each of these embodiments comprises a specific implementation of the apparatus described above and illustrated in FIGS. 5 and 7.

Hopper Interface to the Gaming Machine

Figure 9:
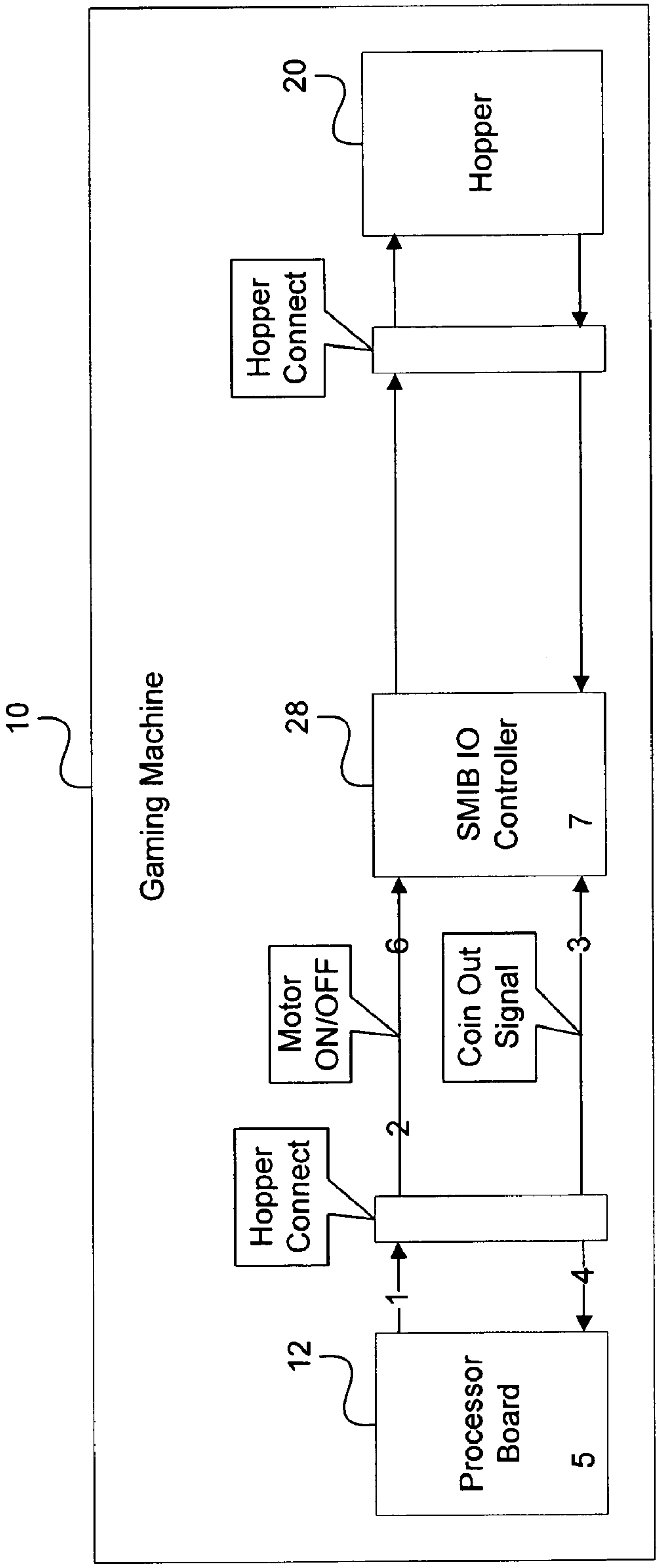
FIG. 9 illustrates an existing cash-type gaming machine modified in accordance with the present invention to permit cash-less transactions.
Figure 10:
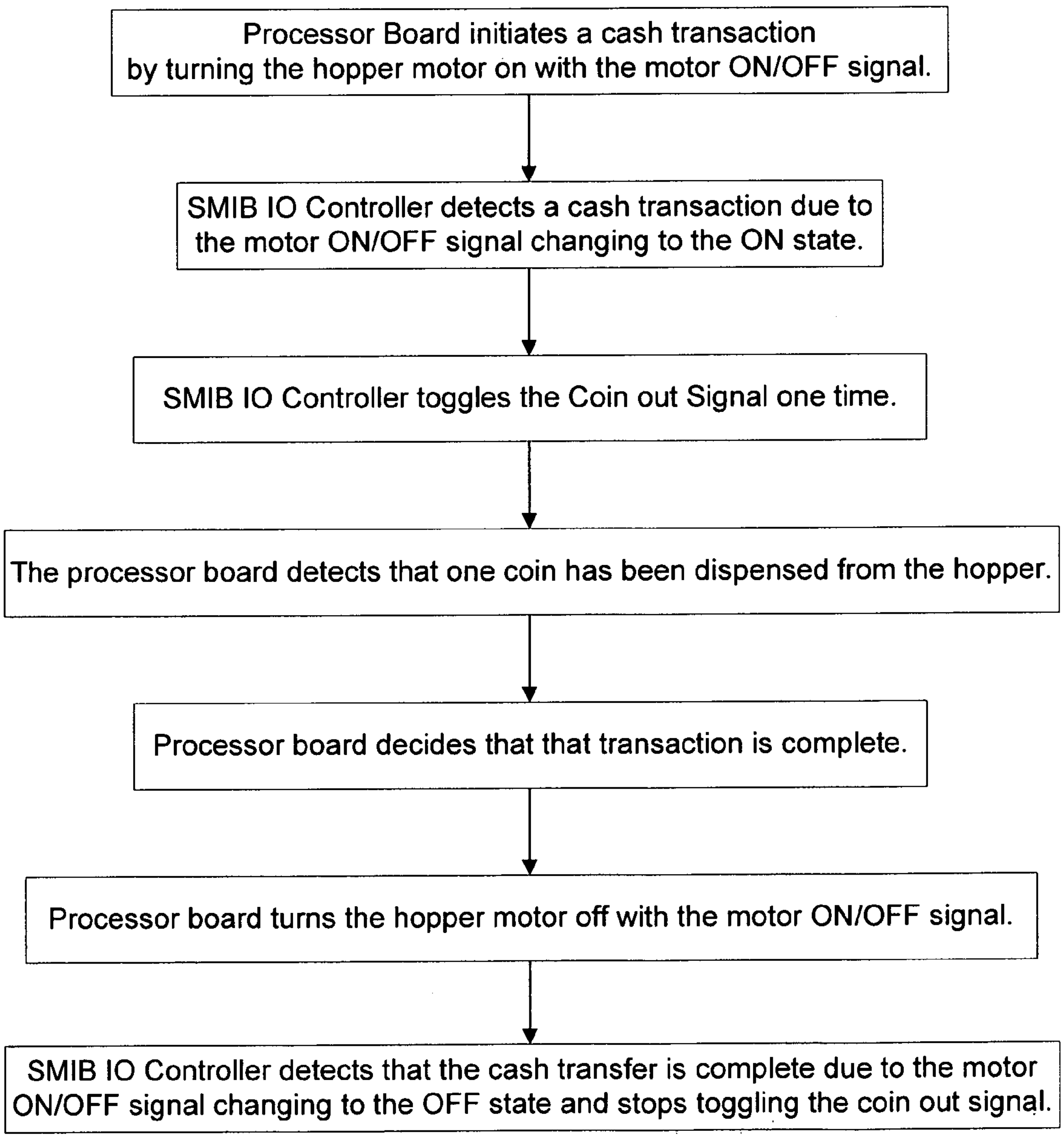
FIG. 10 is substantially a flowchart describing a method of simulating a hopper pay-out in accordance with an embodiment of the invention.

Referring to FIGS. 9 and 10, there is illustrated a method and apparatus for configuring a gaming machine 10 to permit a player to be paid a payout, cashout or the like in a manner other than with cash, in accordance with an embodiment of the invention.

As described in some detail above, gaming machine 10 includes a coin hopper 20 from which winnings are paid, and coins returned, such as when a player cashes out. The hopper 20 includes a control interface which operates as follows. When a machine 10 cashes a player out or pays out winnings, firmware associated with the game machine control (such as the illustrated processor 12) calculates how many coin/tokens that need to be dispensed from the hopper 20. At this point, a motor is activated which controls the hopper 20. The processor 12 samples an input sensor which changes states as coins are being ejected from the hopper. The sensor toggles one time for each coin that is dispensed from the hopper 20. The processor 12 continues to activate the motor on until all of the coins/tokens, for that cash out, have been dispensed by the hopper 20.

In one or more embodiments of the invention, the output drive signal is intercepted. Using this intercepted signal, with compatible hardware, such as the SMIB I/O controller 28, the SMIB 28 can detect when the gaming machine 10 is dispensing coins/tokens from the hopper 20. In addition, the SMIB 28 can provide an output signal to the hopper control which simulates or emulates the dispensing coins/tokens from the hopper 28. When the hopper motor "on" signal is detected, the SMIB 28 toggles (such as by electric signal input) the input sensor at the required specification until the machine 10 turns the motor signal off. Once this is done, the amount that was cashed out is the number of toggles, required to turn the hopper motor signal off, times the currency value of the coin/token. This currency value can then be paid to the player in an alternative form, such as by credit onto a magnetic stripe card or other forms of coded cards, tickets and the like.

Coin Acceptor Interface to the Gaming Machine

Figure 11:
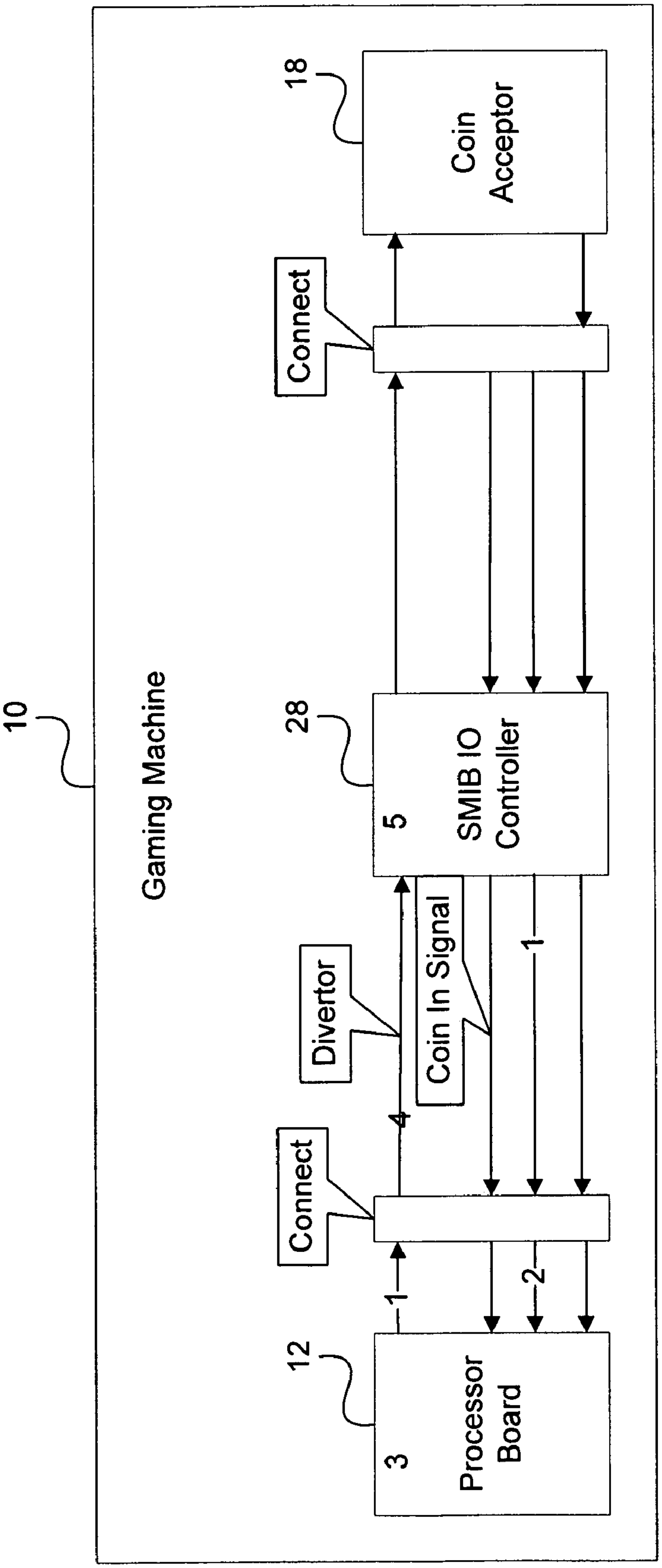
FIG. 11 illustrates an existing cash-type gaming machine modified in accordance with the present invention to permit cash-less transactions.
Figure 12:
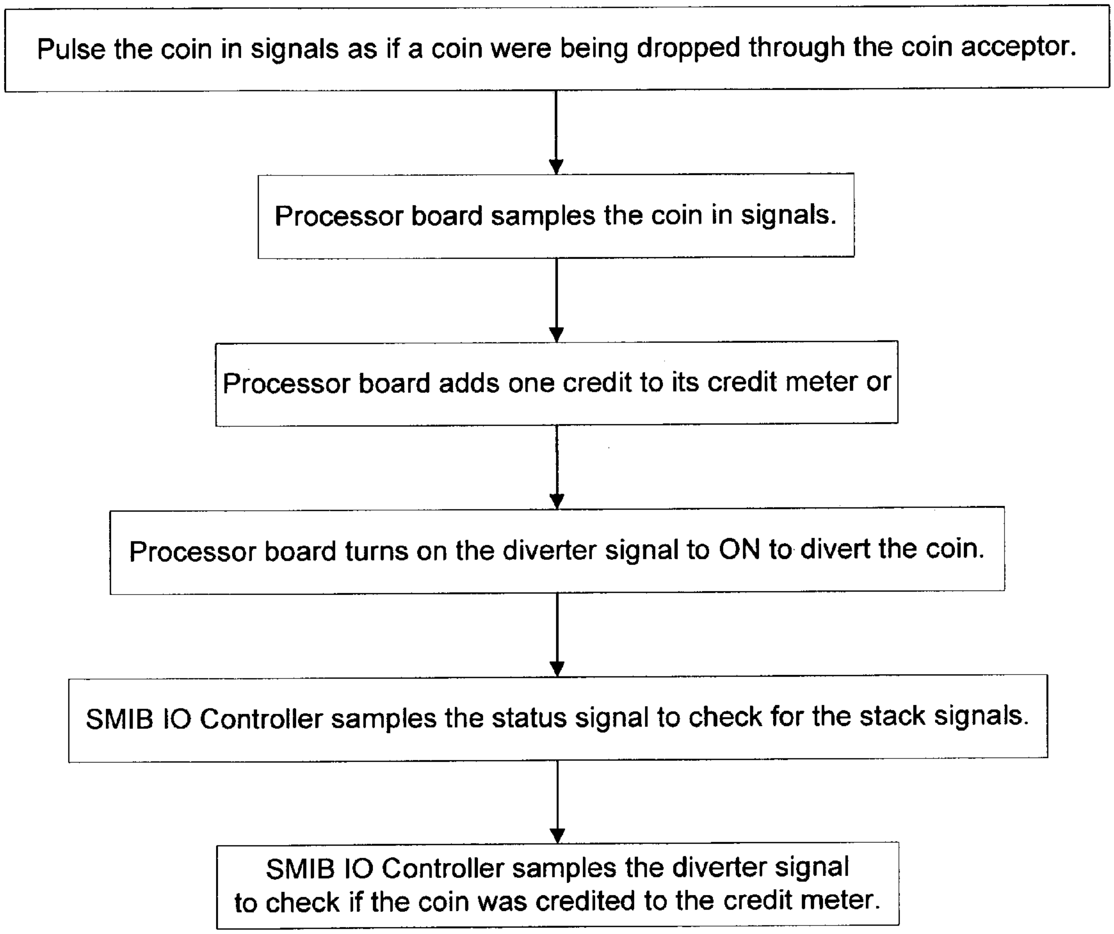
FIG. 12 is substantially a flowchart describing a method of simulating a coin-in transaction in accordance with an embodiment of the invention.

Referring to FIGS. 11 and 12, there is illustrated a method and apparatus for configuring a gaming machine 10 to permit a player to pay in a form other than with cash in accordance with an embodiment of the invention.

Gaming machines 10 often are arranged to accept payment with coins only. These gaming machines 10 include a coin acceptor 18 into which the player deposits the coins or tokens. The coin acceptor interface has one or more input signals (depending on the type of coin acceptor) and output signals to divert coins. When a coin is dropped into the coin acceptor 18 these input signals change states. The firmware within the gaming machine 10 has an algorithm that it runs over the sampled inputs to detect valid coins. When the valid coin inserted criteria is met, the machine's 10 firmware adds one credit to the credit meter 46. If the criteria is not met, the firmware turns the diverter on to reject the coin.

In one or more embodiments of the invention, the input coin signals are intercepted. Using the intercepted signals, with compatible hardware, such as the SMIB I/O controller 28, the SMIB 28 can toggle the coin input signals to simulate coins falling through the coin acceptor 18 on the gaming machine 10. By intercepting the coin output signal, the SMIB 28 can sample the drive signal to the diverter to verify that the coin has been added to the credit meter 14 on the machine. The amount of money that is added to the machine 10 will equal the number of accepted simulated coins times the current value of the coin/token.

Bill Acceptor Interface to the Gaming Machine

Figure 13:
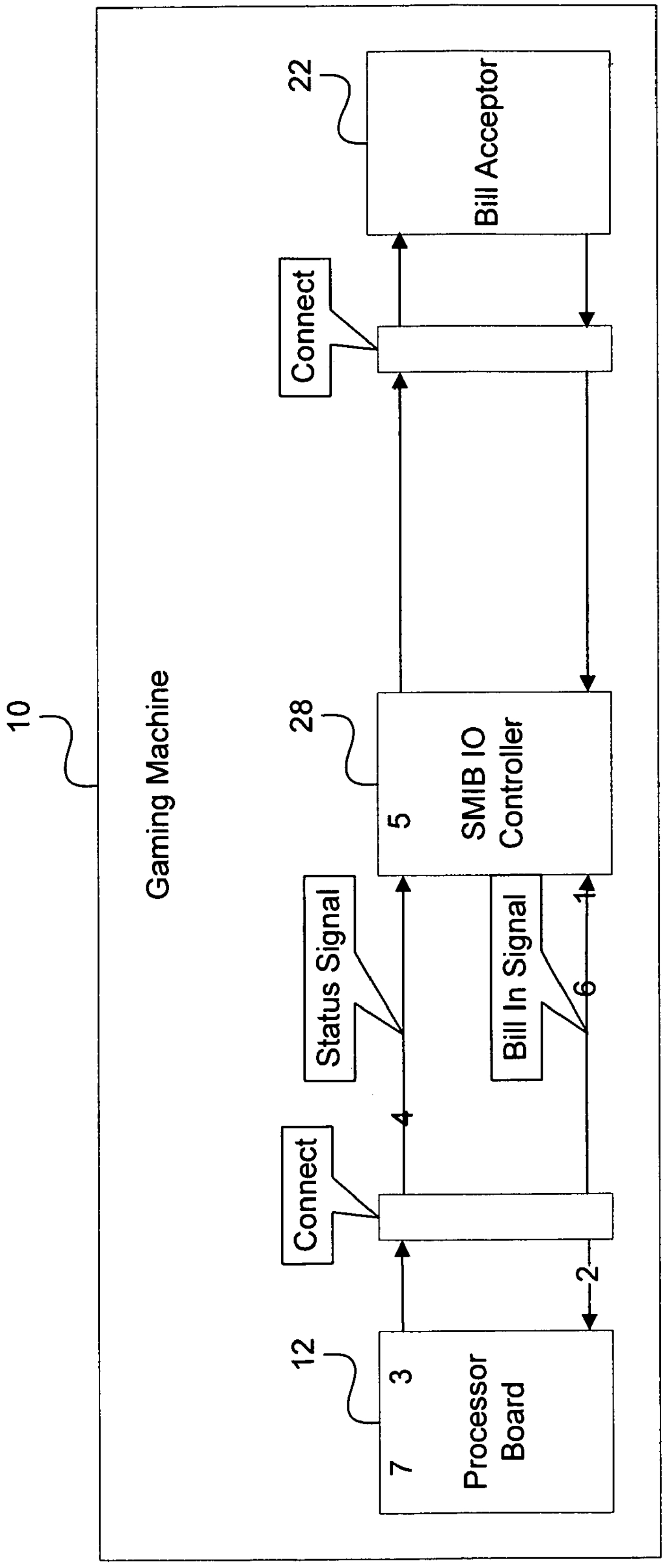
FIG. 13 illustrates an existing cash-type gaming machine modified in accordance with the present invention to permit cash-less transactions.
Figure 14:
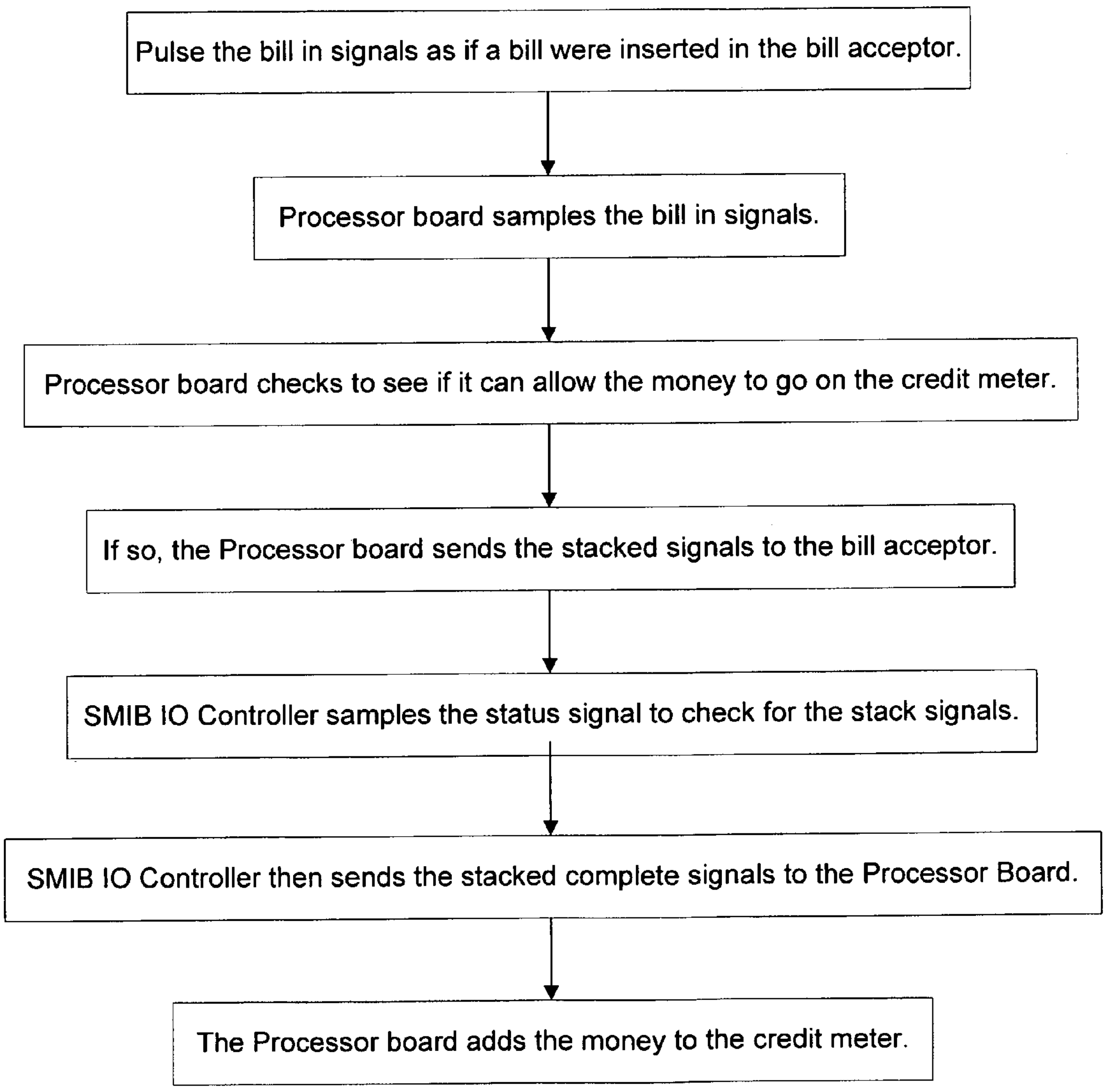
FIG. 14 is substantially a flowchart describing a method of simulating a bill transaction in accordance with an embodiment of the invention.

Referring to FIGS. 13 and 14, there is illustrated a method and apparatus for configuring a gaming machine 10 to permit a player to pay in a form other than with paper currency using a bill validator 22 in accordance with an embodiment of the invention.

In some gaming machine arrangements, the gaming machine 10 is arranged to accept paper currency or "bills" in addition to coins. There are several interfaces between a gaming machine 10 and its bill acceptor 22. One interface is pulsed inputs and outputs, and others utilize serial communications. In any event, the logic for accepting currency is very similar. When a bill is inserted into a bill acceptor 22, the acceptor 22 sends a message with the dollar amount to the game firmware 12 to inform it that a bill has been inserted. At this point, the firmware 12 chooses to stack (accept) or reject the bill. If the firmware 12 chooses to stack the bill, the firmware 12 sends a stack currency message via serial communication or a pulse train. The bill acceptor 22 will stack the currency and send an acknowledgment message via serial communications or a pulse train. If the firmware 12 chooses to reject the bill, it sends a reject currency message via serial communications or a pulse train and the bill acceptor 22 rejects it.

In one or more embodiments of the invention, the communications signal between the processor 12 in the gaming machine 10 and the bill acceptor 22 is intercepted. By intercepting the serial communications or the input and output of the pulsed signals with compatible hardware, such as with a SMIB I/O controller 28, the SMIB 28 can simulate bills being inserted into a bill acceptor 22. One of many benefits of this arrangement is that the SMIB 28 may elect to transfer money onto a machine from a smart card, a system account, etc. The SMIB 28 reads the smart card, player account, etc. and the balance is $25. The SMIB 28 may display the balance and prompt the player to add $20 on the machine 10. If the player elects to add the $20, the SMIB 28 may simulate a $20 bill insertion transaction through the bill acceptor interface. The SMIB 28 may also add money from the player's media or account by using the bill acceptor 22 or by an EFT.

Cash Out Button Interface to the Gaming Machine

Figure 15:
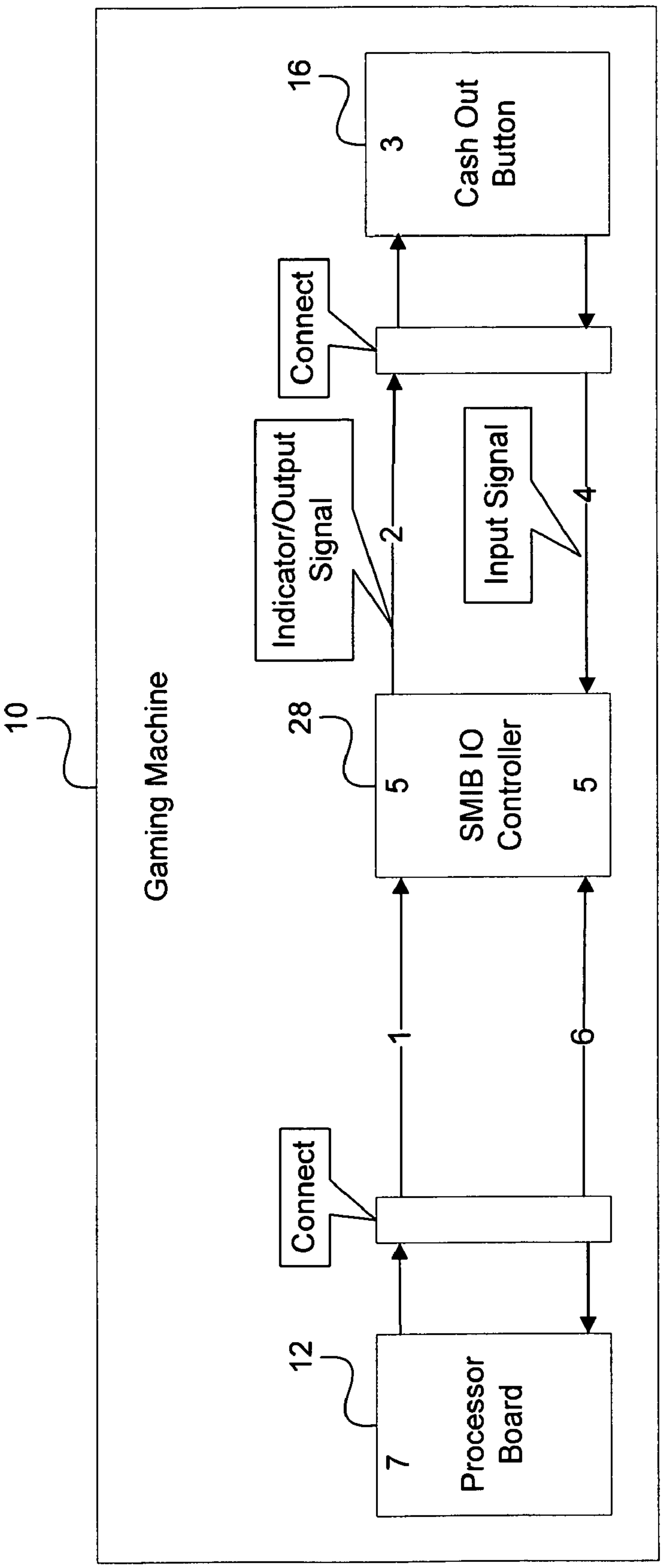
FIG. 15 illustrates an existing cash-type gaming machine modified in accordance with the present invention to permit cash-less transactions.
Figure 16:
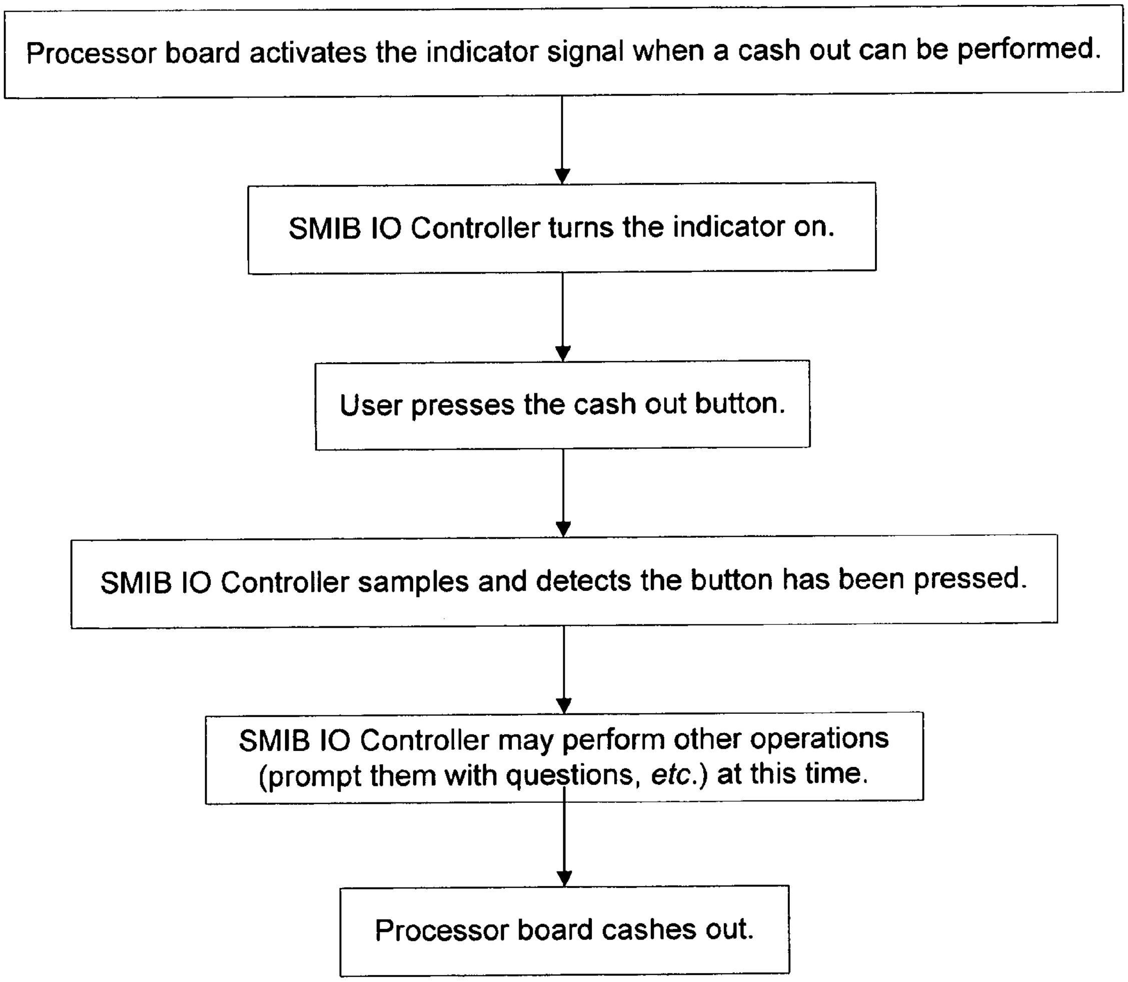
FIG. 16 is substantially a flowchart describing a method of intercepting a cash out signal in accordance with an embodiment of the invention.

Referring to FIGS. 15 and 16, there is illustrated a method and apparatus for configuring a gaming machine 10 to permit a player to "cash-out" in a manner other than with cash in accordance with an embodiment of the invention.

Many standard gaming machines 10 include a cash out button 16 which is associated with an input and output signal. A sampler samples the input signal to check if the button 16 has been pressed or activated. The input signal must change states for a minimum amount of time, such as a few milliseconds, to be considered activated or pressed. The output signal to the cash out button 16 is a lamp driver. The gaming machine turns the lamp on to show the player that the button 16 is in an active state and that a "cash out" can be preformed at the current time, and turns the lamp off for when the player is not permitted to cash out.

In one embodiment of the invention, the output signals associated with a case out button 16 are intercepted. This signal interception may be accomplished with compatible hardware, such as the SMIB I/O controller 28. In this manner, a SMIB 28 can detect when the machine is in a state that the player can perform a cash out. In this embodiment, the input signals are also intercepted. By intercepting the input signals with compatible hardware, the SMIB 28 can detect when a player has pressed the cash out button and elect to perform other functions before committing the machine to the cash out.

In one embodiment, when a player has elected to cash out, the SMIB 28 permits a player to elect how they wish to cash out. For example, the SMIB 28 may cause the display on 36 of a message to the player such as, "Would you like your credits to be paid from the hopper, added to your account or added to your smart card?" Depending on the player's decision, the SMIB 28 may dispense the coins from the hopper 20, simulate a hopper cash out and add the credits to the player's account, smart card, etc., or perform an electronic fund transfer via a communication protocol supported by the gaming machine 10 and add the credits to the player's account, smart card or the like.

In the event a player elects to cash out by payment of coins from the hopper 20, the coins are paid in a normal fashion. In the event the player elects to cash out in another form, then the SMIB 28 is arranged to cause payment by the other means, such as by coding payment data onto a smart card. As described above, in such an event, the SMIB 28 may be arranged to cause the gaming machine to not pay the coins from the hopper 20 and to use a signal which operates the coin dispenser to determine the payout to the player.

Serial Communication Interfaces to the Gaming Machine

In one or more embodiments of the invention such as shown in FIGS. 5 and 6 or 7 and 8, a method and apparatus is provided for configuring a gaming machine 10 to accept payment and render payment via an electronic interface.

The serial communication interfaces are hardware signals that transmit data between two devices. The two devices in scope will be the gaming machine logic board 12 and the SMIB 28. Each interface has a unique protocol to allow funds to be transferred electronically. The SMIB 28 has the option to interface to the game logic using the protocols to transfer funds to and from the gaming machine's credit meter 10. Such protocols may comprise SAS, X-Miser and SDS and other known protocols.

In one or more embodiments of the invention, the method (s) may be performed with a variety of hardware and/or software other than those described above and illustrated. In one or more embodiments, computer or application code may be configured to cause a computer or other device to generate emulating output signals and other instructions for transmission to the processor board of a gaming machine for use in permitting the cash-less transaction. Such application code may be embodied in any form of computer program product comprising a medium configured to store or transport computer readable code, or in which the code may be embedded. By computer it is meant a processing/runtime environment for such code, such as a processor or the like.

It will be understood that the present invention may be applied to individual or multiple aspects of a gaming machine's devices. For example, the invention may be applied solely to the coin-dispensing/hopper device of a machine. The invention may also be applied to both the coin accepting and dispensing devices of a machine. As may be appreciated, there are a wide variety of combinations of modifications which may be made in accordance with the invention to render one or more aspects of a gaming machine "cash-less."

The methods and apparatus of the invention permit an existing gaming machine which accepts and/or pays in only cash to accept payment and payout in forms other than cash. This is accomplished without the need to alter the gaming machine's existing firmware/hardware/software. As such, the converted gaming machine may avoid having to be re-approved by regulatory bodies. The present invention permits modification of a gaming or similar machine in a manner which is simple, cost-efficient, and not time consuming.

The methods and apparatus of the invention permit conversion of a gaming machine in a manner whereby any form of payment or payout may be accomplished, whether such is by electronic account, coded card or the like. The method and apparatus of the invention may be implemented in a manner which still permits a player to pay in or receive a payout in cash form. It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A gaming machine comprising:

a gaming unit having a housing, the housing comprising gaming components comprising:

(a) a game interface, the game interface configured to allow a game player to conduct gaming functions;

(b) a game processor located in the housing and in communication with the game interface, the game processor configured to control the game functions and game machine components;

(c) a cash transaction unit, the cash transaction unit configured to accept cash from, and dispense cash to, the game player, the cash transaction unit comprising:

i. a coin acceptor associated with the housing and configured to accept coins from the player;

ii. a coin dispenser associated with the housing; the coin dispenser configured to dispense coins to the player;

iii. a coin hopper, the coin hopper in communication with the coin acceptor and coin dispenser, the coin hopper configured to hold coins until they are to be dispensed to the player;

iv. a coin hopper controller associated with the housing and in communication with the coin acceptor, coin hopper and game processor; the coin hopper controller configured to detect coins inserted into the coin acceptor and to cause coins to be dispensed from the coin dispenser when directed by the game processor;

(B) the gaming machine being modified in a retrofit fashion to further comprise a cash-less transaction system comprising:

(a) a cash-less device transaction unit mounted in communication with the game processor, the cash-less device transaction unit configured to accept cash-less devices and to transmit and receive information;

(b) an interception and emulation unit mounted in communication with the cash-less device transaction unit and the game processor; wherein the interception and emulation unit is configured to perform the following:

i. intercept signals from the game processor, whereby the intercepted signals are not received as originally intended;

ii. emulate signals corresponding to gaming functions and transmit the signals to game components.

2. The gaming machine of claim 1 wherein the cash-less transaction system further comprises a network communication link between the cash-less transaction system and a remote network, the remote network configured to store cash-less device information.

3. The gaming machine of claim 2 wherein the remote network and the cash-less transaction system may exchange information regarding the cash-less device.

4. The gaming machine of claim 1 wherein the interception and emulation unit comprises:

(A) a smart machine interface board input/output controller (SMIB-I/O) interfaced with the game processor, wherein the SMIB-I/O is configured to intercept signals from, and transmit signals to, the game processor;

(B) a smart machine interface board (SMIB) in communication with the SMIB-I/O, the SMIB configured to receive signals from, and transmit signals to, the SMIB-I/O.

5. The gaming machine of claim 1 wherein the cash-less transaction system is located in a housing separate from the gaming machine housing.

6. The gaming machine of claim 1 wherein the cash transaction unit further comprises a paper currency acceptor, the paper currency acceptor in communication with the game processor.

7. A method of providing cash-less gaming in a gaming machine retrofitted to accept a cash-less devices comprising:

providing a game machine to a player, wherein the gaming machine is configured to accept currency, and wherein the game machine has been retrofitted to accept cash-less devices;

accepting a cash-less device from the player;

sending a signal from a cash-emulation unit to a game processor, the signal directing the game processor to perform a game function, wherein the cash-emulation unit has been added to the gaming machine in a retrofit manner;

intercepting a signal from the game processor by an interception unit, whereby the signal sent from the game processor does not reach the intended recipient as originally intended by the game processor, wherein the interception unit has been added to the gaming machine in a retrofit manner; and updating a value represented by the cash-less device, the value comprising at least one of the intercepted and emulated game processor signals.

8. The method of claim 7 further comprising maintaining a network connection between a remote network and at least one of the interception unit and the cash-emulation unit.

9. The method of claim 8 further comprising exchanging information about the cashless device over the network connection.

* * * * *

UNITED STATES PATENT AND TRADEMARK OFFICE

CERTIFICATE OF CORRECTION

PATENT NO. : 7,004,837 B1 Page 1 of 1
DATED : February 28, 2006
INVENTOR(S) : Crowder, Jr. et al.

It is certified that error appears in the above-identified patent and that said Letters Patent is hereby corrected as shown below:

Column 7,
Line 60, replace "preformed" with -- performed --.
Line 63, replace "case out" with -- cash out --.

Column 8,
Lines 41-42, replace "method (s)" with -- method(s) --.

Column 9,
Line 22, before "a gaming unit" add -- (A) --.

Column 10,
Line 59, replace "cashless" with -- cash-less --.

Signed and Sealed this

Sixth Day of June, 2006

JON W. DUDAS
*Director of the United States Patent and Trademark Office*